United States Patent
Mimeault et al.

(10) Patent No.: US 8,242,476 B2
(45) Date of Patent: Aug. 14, 2012

(54) LED OBJECT DETECTION SYSTEM AND METHOD COMBINING COMPLETE REFLECTION TRACES FROM INDIVIDUAL NARROW FIELD-OF-VIEW CHANNELS

(75) Inventors: Yvan Mimeault, Québec (CA); Daniel Cantin, Québec (CA); Pascal Gallant, Québec (CA)

(73) Assignee: Leddartech Inc., Quebec, Quebec (CA)

( * ) Notice: Subject to any disclaimer, the term of this patent is extended or adjusted under 35 U.S.C. 154(b) by 0 days.

(21) Appl. No.: 12/949,212

(22) Filed: Nov. 18, 2010

(65) Prior Publication Data
US 2011/0205521 A1 Aug. 25, 2011

Related U.S. Application Data (63) Continuation-in-part of application No. 11/612,678, filed on Dec. 19, 2006, now Pat. No. 7,855,376, and a continuation of application No. 12/664,744, filed as application No. PCT/CA2008/001161 on Jun. 18, 2008, application No. 12/966,753, which is a continuation of application No. 12/664,753, filed as application No. PCT/CA2008/001160 on Jun. 18, 2008.

(60) Provisional application No. 60/751,284, filed on Dec. 19, 2005, provisional application No. 60/944,658, filed on Jun. 18, 2007, provisional application No. 60/944,657, filed on Jun. 18, 2007.

(51) Int. Cl.
*G01N 21/86* (2006.01)
*G06M 7/00* (2006.01)

(52) U.S. Cl. .................. 250/559.29; 250/221

(58) Field of Classification Search .......... 250/221, 250/208.1, 214 R, 214.1, 559.19, 559.2, 559.21, 250/559.22, 559.24, 338.1, 339.01, 339.02, 250/339.06, 339.11, 205, 559.29, 559.38, 250/559.4; 356/2, 3–3.16, 4.01, 601–614, 356/625, 627, 628, 634–640, 237.1; 340/500, 340/540, 541, 555–557, 552, 567; 235/435, 235/439, 440, 454, 462.01, 462.11, 462.16, 235/462.17, 462.24, 462.41, 462.42, 468
See application file for complete search history.

(56) References Cited

U.S. PATENT DOCUMENTS
3,680,085 A 7/1972 Del Signore
(Continued)

FOREIGN PATENT DOCUMENTS
CA 2710212 7/2009
(Continued)

OTHER PUBLICATIONS
United States Department of Transportation, Federal Highway Administration, Sensor Technology—Chapter 2, Traffic Detector Handbook : Third Edition—vol. 1, FHWA-HRT-06-108, available at http://www.tfhrc.gov/its/pubs/06108/02a.htm on Sep. 16, 2009.
(Continued)

*Primary Examiner* — Pascal M Bui Pho
(74) *Attorney, Agent, or Firm* — Fasken Martineau

(57) ABSTRACT

A multi-channel LED object detection system and a method for detecting an object are provided. The method includes providing and orienting a light source having a wide field-of-illumination to encompass the width of the environment; providing and orienting a detector having a wide field-of-view to encompass the width of the environment, the detector having a plurality of sub-detectors with individual narrow field-of-views, driving the LED source into emitting light to illuminate the width of the environment; receiving and acquiring an individual complete trace of a reflection/backscatter of the emitted light on the object at each sub-detector; converting the acquired individual complete trace into an individual digital signal; and detecting and identifying a presence of an object, a position of the object, a distance between the object and the LED source and/or a visibility, using the emitted light waveform and an individual digital signal.

22 Claims, 8 Drawing Sheets

U.S. PATENT DOCUMENTS

| | | | |
|---|---|---|---|
| 3,967,111 A | 6/1976 | Brown | |
| 4,717,862 A | 1/1988 | Anderson | |
| 4,733,961 A | 3/1988 | Mooney | |
| 4,928,232 A | 5/1990 | Gentile | |
| 5,102,218 A | 4/1992 | Min et al. | |
| 5,134,393 A | 7/1992 | Henson | |
| 5,179,286 A | 1/1993 | Akasu | |
| 5,317,311 A | 5/1994 | Martell et al. | |
| 5,357,331 A | 10/1994 | Flockencier | |
| 5,381,155 A | 1/1995 | Gerber | |
| 5,389,921 A | 2/1995 | Whitton | |
| 5,621,518 A | 4/1997 | Beller | |
| 5,629,704 A | 5/1997 | Throngnumchai et al. | |
| 5,633,629 A | 5/1997 | Hochstein | |
| 5,714,754 A | 2/1998 | Nicholas | |
| 5,760,686 A | 6/1998 | Toman | |
| 5,760,887 A | 6/1998 | Fink et al. | |
| 5,764,163 A | 6/1998 | Weldman et al. | |
| 5,777,564 A | 7/1998 | Jones | |
| 5,805,468 A | 9/1998 | Blöhbaum | |
| 5,828,320 A | 10/1998 | Buck | |
| 5,836,583 A | 11/1998 | Towers | |
| 5,838,116 A | 11/1998 | Katyl et al. | |
| 5,889,477 A | 3/1999 | Fasterath | |
| 5,896,190 A | 4/1999 | Wangler et al. | |
| 5,942,753 A | 8/1999 | Dell | |
| 5,995,900 A | 11/1999 | Hsiao et al. | |
| 6,044,336 A | 3/2000 | Marmarelis et al. | |
| 6,094,159 A | 7/2000 | Osterfeld et al. | |
| 6,100,539 A | 8/2000 | Blümcke et al. | |
| 6,104,314 A | 8/2000 | Jiang | |
| 6,107,942 A | 8/2000 | Yoo et al. | |
| 6,115,113 A | 9/2000 | Flockencier | |
| 6,142,702 A | 11/2000 | Simmons | |
| 6,147,624 A | 11/2000 | Clapper | |
| 6,166,645 A | 12/2000 | Blaney | |
| 6,259,515 B1 | 7/2001 | Benz et al. | |
| 6,259,862 B1 | 7/2001 | Marino et al. | |
| 6,266,609 B1 | 7/2001 | Fastenrath | |
| 6,281,632 B1 | 8/2001 | Stam et al. | |
| 6,285,297 B1 | 9/2001 | Ball | |
| 6,340,935 B1 | 1/2002 | Hall | |
| 6,377,167 B1 | 4/2002 | Juds et al. | |
| 6,404,506 B1 | 6/2002 | Cheng et al. | |
| 6,411,221 B2 | 6/2002 | Horber | |
| 6,417,783 B1 | 7/2002 | Gabler et al. | |
| 6,426,708 B1 | 7/2002 | Trajkovic et al. | |
| 6,502,011 B2 | 12/2002 | Haag | |
| 6,516,286 B1 | 2/2003 | Aebischer et al. | |
| 6,548,967 B1 | 4/2003 | Dowling et al. | |
| 6,556,916 B2 | 4/2003 | Waite et al. | |
| 6,559,776 B2 | 5/2003 | Katz | |
| 6,642,854 B2 | 11/2003 | McMaster | |
| 6,650,250 B2 | 11/2003 | Muraki | |
| 6,665,621 B2 | 12/2003 | Drinkard et al. | |
| 6,753,766 B2 | 6/2004 | Patchell | |
| 6,753,950 B2 | 6/2004 | Morcom | |
| 6,771,185 B1 | 8/2004 | Yoo et al. | |
| 6,794,831 B2 | 9/2004 | Leeb et al. | |
| 6,821,003 B2 | 11/2004 | Baker et al. | |
| 6,825,778 B2 | 11/2004 | Bergan et al. | |
| 6,831,576 B2 | 12/2004 | Geiger et al. | |
| 6,836,317 B1 | 12/2004 | Perger | |
| 6,842,231 B2 | 1/2005 | Nourrcier et al. | |
| 6,885,311 B2 | 4/2005 | Howard | |
| 6,885,312 B1 | 4/2005 | Kirkpatrick | |
| 6,917,307 B2 | 7/2005 | Li | |
| 6,927,700 B1 | 8/2005 | Quinn | |
| 6,946,974 B1 | 9/2005 | Racunas, Jr. | |
| 7,026,954 B2 | 4/2006 | Slemmer et al. | |
| 7,081,832 B2 | 7/2006 | Nelson et al. | |
| 7,106,214 B2 | 9/2006 | Jesadanont et al. | |
| 7,116,246 B2 | 10/2006 | Winter et al. | |
| 7,119,674 B2 | 10/2006 | Sefton | |
| 7,119,715 B2 | 10/2006 | Orita | |
| 7,123,166 B1 | 10/2006 | Haynes et al. | |
| 7,135,991 B2 | 11/2006 | Slemmer et al. | |
| 7,148,813 B2 | 12/2006 | Bauer | |
| 7,221,271 B2 | 5/2007 | Reime | |
| 7,236,102 B2 | 6/2007 | Shimotani | |
| 7,250,605 B2 | 7/2007 | Zhevelev et al. | |
| 7,253,747 B2 | 8/2007 | Noguchi | |
| 7,317,384 B2 | 1/2008 | Lefranc | |
| 7,321,317 B2 | 1/2008 | Nath et al. | |
| 7,352,972 B2 | 4/2008 | Franklin | |
| 7,405,676 B2 | 7/2008 | Janssen | |
| 7,426,450 B2 | 9/2008 | Arnold et al. | |
| 7,486,204 B2 | 2/2009 | Quintos | |
| 7,499,090 B2 * | 3/2009 | Olmstead et al. | 348/296 |
| 7,527,207 B2 * | 5/2009 | Acosta et al. | 235/462.31 |
| 7,573,400 B2 | 8/2009 | Arnold et al. | |
| 2003/0154017 A1 | 8/2003 | Ellis | |
| 2003/0189500 A1 | 10/2003 | Lim | |
| 2004/0070745 A1* | 4/2004 | Lewis et al. | 356/5.01 |
| 2004/0083035 A1 | 4/2004 | Ellis | |
| 2005/0046597 A1 | 3/2005 | Hutchison et al. | |
| 2005/0117364 A1 | 6/2005 | Rennick et al. | |
| 2005/0187701 A1 | 8/2005 | Baney | |
| 2005/0231384 A1 | 10/2005 | Shimotani | |
| 2005/0270175 A1 | 12/2005 | Peddie et al. | |
| 2006/0033641 A1 | 2/2006 | Jaupitre | |
| 2006/0145824 A1 | 7/2006 | Frenzel et al. | |
| 2006/0180670 A1 | 8/2006 | Acosta et al. | |
| 2007/0018106 A1 | 1/2007 | Zhevelev et al. | |
| 2007/0018116 A1* | 1/2007 | Lustenberger et al. | 250/458.1 |
| 2007/0061192 A1 | 3/2007 | Chew | |
| 2007/0090191 A1* | 4/2007 | Schnee et al. | 235/462.41 |
| 2007/0091294 A1 | 4/2007 | Hipp | |
| 2007/0096943 A1 | 5/2007 | Arnold et al. | |
| 2007/0205918 A1 | 9/2007 | Riesco Prieto et al. | |
| 2007/0222639 A1 | 9/2007 | Giles et al. | |
| 2007/0228262 A1 | 10/2007 | Cantin et al. | |
| 2007/0255525 A1 | 11/2007 | Lee et al. | |
| 2008/0006762 A1 | 1/2008 | Fadell et al. | |
| 2008/0172171 A1 | 7/2008 | Kowalski | |
| 2009/0299631 A1 | 12/2009 | Hawes et al. | |

FOREIGN PATENT DOCUMENTS

| | | |
|---|---|---|
| DE | 19604338 | 7/2004 |
| DE | 102004035856 | 3/2005 |
| DE | 102006025020 | 11/2007 |
| DE | 202008007078 | 10/2008 |
| DE | 102009013841 | 9/2009 |
| EP | 0318260 | 5/1989 |
| EP | 0476562 | 3/1992 |
| EP | 0494815 | 12/1996 |
| EP | 0838695 | 4/1998 |
| EP | 0612049 | 9/1998 |
| EP | 0988624 | 3/2000 |
| EP | 0912970 | 4/2000 |
| EP | 1034522 | 9/2000 |
| EP | 0798684 | 1/2001 |
| EP | 0779990 | 3/2003 |
| EP | 0935764 | 3/2003 |
| EP | 1296302 | 3/2003 |
| EP | 0789342 | 6/2003 |
| EP | 1334869 | 8/2003 |
| EP | 0784302 | 9/2003 |
| EP | 0866434 | 6/2004 |
| EP | 1521226 | 6/2006 |
| EP | 1049064 | 9/2006 |
| EP | 1048961 | 7/2009 |
| EP | 1224632 | 12/2009 |
| EP | 2136550 | 12/2009 |
| EP | 1435036 | 1/2010 |
| EP | 1611458 | 4/2010 |
| EP | 1997090 | 9/2010 |
| FR | 2690519 | 10/1993 |
| GB | 2264411 | 8/1993 |
| GB | 2354898 | 7/2003 |
| GB | 2431498 | 4/2007 |
| GB | 2445767 | 7/2008 |
| JP | 2002059608 | 2/1990 |
| JP | 2004102889 | 4/2004 |
| JP | 2006172210 | 6/2006 |
| WO | 8705138 | 8/1987 |
| WO | 9203808 | 3/1992 |

| | | |
|---|---|---|
| WO | 9634252 | 10/1996 |
| WO | 9904378 | 1/1999 |
| WO | 0139153 | 5/2001 |
| WO | 0215334 | 2/2002 |
| WO | 03007269 | 1/2003 |
| WO | 2004039631 | 5/2004 |
| WO | 2004100103 | 11/2004 |
| WO | 2005072358 | 8/2005 |
| WO | WO2006/007866 * | 1/2006 |
| WO | 2006044758 | 4/2006 |
| WO | 2006092659 | 9/2006 |
| WO | 2007071032 | 6/2007 |
| WO | 2007096814 | 8/2007 |
| WO | 2008037049 | 4/2008 |
| WO | 2008154737 | 12/2008 |
| WO | 2009013739 | 1/2009 |
| WO | 2009087536 | 7/2009 |
| WO | 2009104955 | 8/2009 |
| WO | 2009117197 | 9/2009 |

OTHER PUBLICATIONS

United States Department of Transportation, Research and Innovative Technology Administration, 5.3. Infrared Detectors, available at http://ntl.bts.gov/DOCS/96100/ch05/body_ch05_03.html on Sep. 16, 2009.

Lawrence A. Klein, Vehicle Detector Technologies for Traffic Management Applications, Part 1, Colorado Department of Transportation, Intelligent Transportation Systems (ITS), 1997, available at http://www.cotrip.org/its/ITS%20Guidelines%20Web%20New%20Format%202-05/Web%20Solutions%20Packages/ITS%20Solution%20Packages%20-%20Web%20Copy/Vehicle%20Detectors/Klein%20Part%201%20Vehicle%20Detector%20Technologies.doc on Sep. 16, 2009.

Hussain, Tarik Mustafa, City University of New-York, Infrared Vehicle Sensor for Traffic Control, Thesis (PHD) City University of New York, Dissertation Abstracts International, vol. 55-07, Section A, p. 2176, 1994, available at http://adsabs.harvard.edu//abs/1994PhDT . . . 85H on Sep. 16, 2009.

Dimitri Loukakos, Active Laser infrared Detectors, Intelligent Transportation Systems, Traffic Surveillance, California Center for Innovative Transportation at the University of California, Dec. 20, 2001, available at http://www.calccit.org/itsdecision/serv_and_tech/Traffic_Surveillance/road-based/roadside/other_roadside_rep.html on Sep. 16, 2009.

Geneq Inc., Passive Infrared Detector for Traffic Data Acquisition, Model IR 250, Department of Meteorology available at http://www.geneq.com/catalog/en/Ir250.html on Sep. 16, 2009.

The Vehicule Detector Clearinghouse, "A Summary of Vehicle Detection and Surveillance Technologies used in Intelligent Transportation Systems", Fall 2000, Southwest Technology Development Institute (SWTDI) at New Mexico State University (NMSU), sponsored in cooperation with the U.S. Department of Transportation FHWA, available at http://www.fhwa.dot.gov/ohim/tvtw/vdstits.

U.S. Department of Transportation Federal Highway Administration, "Detailed Monitoring Protocol 4.0 Monitoring Methods", Department of Air Quality, Air Toxic MSAT, available at http://www.fhwa.dot.gov/environment/air_quality/air_toxics/research_and_analysis/near_road_study/protocol/protocol04.cfm, Updated on Jul. 6, 2011.

Tayfun Kon, Thesis, "Collision Warning and Avoidance System for Crest Vertical Curves", Virginia Tech, May 4, 1998, Appendix 82, pp. 51-92, published on Digital Library and Archives, University Libraries of Virginia Tech, VA.

* cited by examiner

LED OBJECT DETECTION SYSTEM AND METHOD COMBINING COMPLETE REFLECTION TRACES FROM INDIVIDUAL NARROW FIELD-OF-VIEW CHANNELS

CROSS-REFERENCE TO RELATED APPLICATIONS

This patent application is a continuation-in-part of U.S. patent application Ser. No. 11/612,678 filed on Dec. 19, 2006 now U.S. Pat. No. 7,855,376, and allowed, which in turn claims priority on U.S. Provisional Patent Application No. 60/751,284, filed on Dec. 19, 2005, by Applicant, the specifications of which are hereby incorporated by reference.

This patent application is also a continuation of U.S. patent application Ser. No. 12/664,744 filed on Dec. 15, 2009, now pending, which is a US national phase entry of PCT patent application no. PCT/CA2008/001161 filed on Jun. 18, 2008 which in turn claims priority on U.S. Provisional Patent Application No. 60/944,658, filed on Jun. 18, 2007, by Applicant, the specifications of which are hereby incorporated by reference.

This patent application is also a continuation of U.S. patent application Ser. No. 12/664,753 filed on Dec. 15, 2009, now pending, which is a US national phase entry of PCT patent application no. PCT/CA2008/001160 filed on Jun. 18, 2008 which in turn claims priority on U.S. Provisional Patent Application No. 60/944,657, filed on Jun. 18, 2007, by Applicant, the specifications of which are hereby incorporated by reference.

TECHNICAL FIELD

The present invention generally relates to object detection systems and more particularly to multi-channel object detection systems using light emitted by a LED light source.

BACKGROUND OF THE ART

According to the Britannica Concise Encyclopedia, a range finder is an instrument used to measure the distance from the instrument to a selected point or object. The optical range finder, used chiefly in cameras, consists of an arrangement of lenses and prisms set at each end of a tube. The object's range is determined by measuring the angles formed by a line of sight at each end of the tube; the smaller the angles, the greater the distance, and vice versa. Since the mid-1940s, radar has replaced optical range finders for most military targeting, and the laser range finder, developed in 1965, has largely replaced optical range finders for surveying and radar in certain military applications.

The most common form of laser rangefinder operates on the time of flight principle by sending a laser pulse in a narrow beam towards the object and measuring the time taken by the pulse to be reflected off the target and returned to the sender. Lasers have the property of efficiently collimating their beam and therefore concentrate their energy in a narrow angular range. The Field-of-illumination (FOI) of the laser rangefinder is therefore much narrower than the Field-of-view (FOV) of the detector. When the pulse is reflected off the target, only a portion of the reflected light is reflected toward the detector. This portion is what is captured by the laser rangefinder and a detection of an object is only identified if a reflection threshold is reached at the detector.

The concentrated laser beam has many advantages. If the surface of the object reflects a great portion of the laser beam it receives toward the detector, it is very efficient. However, if the surface of the object is not exactly at a right angle to the beam and it has some specular reflection effects, the major portion of the reflection will be oriented in a direction other than that of the detector. The object will then not be detected. Additionally, if some sections of the surface of an object illuminated by the laser beam have very poor reflectivity, the amplitude of the reflection received by the detector will not be enough to reach the preset threshold and the object will not be detected. The laser rangefinder therefore presents reliability issues.

A car is a good example of an object which has surfaces with varying reflectivity and portions with different shapes and angles. Some sections of the car which have very high reflectivity, such as the retro-reflector typically located at the back of the vehicles will have extremely high reflectivity toward the source but are very small in size and unlikely to receive the very collimated beam of the laser source. Some sections of the car with varying shapes will reflect the very collimated beam of the laser source in many different directions and not necessarily toward the detector and may therefore go undetected.

There are therefore some drawbacks to the use of prior art systems, especially laser rangefinders.

SUMMARY

According to one embodiment, there is provided a method for detecting an object located in an environment. A Light-Emitting-Diode (LED) light source having a wide field-of-illumination is provided and oriented such that the wide field-of-illumination encompasses a width of the environment. An optical detector having a wide field-of-view is provided and oriented such that the wide field-of-view encompasses the width of the environment. The LED light source is driven into emitting light toward the environment, the width of the environment being illuminated by the light. A complete trace of a reflection/backscatter of the emitted light on the object in the environment is received and acquired using the optical detector. The acquired complete trace of the reflection/backscatter is then converted into a digital signal. Finally, a step of detecting and identifying is carried out to detect and identify at least one of a presence of an object in the environment, a position of the object in the environment, a distance between the object and the LED light source and a visibility in the environment, using the digital signal.

In one embodiment, the optical detector can include a plurality of optical sub-detectors, each having an individual narrow field-of-view. In one embodiment, the optical sub-detectors can detect simultaneously, in sequence or in combination. In one embodiment, their fields-of-view can overlap partly or completely or they can be adjacent to one another. In one embodiment, each optical sub-detector is able to receive and acquire a complete trace of the reflection for its own field-of-view, thereby creating a channel in the environment in which it is acquiring. The use of a plurality of sub-detectors allows a multichannel object detection. In one embodiment, the detection can be performed in one, multiple or all channels.

According to one embodiment, there is provided a multi-channel LED object detection system for detecting an object located in an environment. In one embodiment, it includes a Light-Emitting-Diode (LED) light source having a wide field-of-illumination oriented for the wide field-of-illumination to encompass the width of the environment; a source controller for the LED light source for driving the LED light source into emitting light toward the environment, the width of the environment being illuminated by the light; an optical detector having a wide field-of-view oriented for the wide field-of-view to encompass the width of the environment, the optical detector receiving a complete trace of a reflection/backscatter of the emitted light on the object in the environment; an analog-to-digital converter for converting the complete trace of the reflection/backscatter into a digital signal; a memory for acquiring and storing the complete trace; and a signal processor for detecting and identifying at least one of a presence of an object in the environment, a position of the object in the environment and a distance between the object and the LED light source, using the digital signal and outputting a data output associated to the object.

According to one embodiment, a method for detecting an object located in an environment is provided. The method includes providing a Light-Emitting-Diode (LED) light source having a wide field-of-illumination and orienting the LED light source for the wide field-of-illumination to encompass the width of the environment; providing an optical detector having a wide field-of-view and orienting the optical detector for the wide field-of-view to encompass the width of the environment, the optical detector having a plurality of sub-detectors, each having an individual narrow field-of-view, each individual narrow field-of-view creating a channel in the wide field-of-view; driving the LED light source into emitting light toward the environment, the width of the environment being illuminated by the light, the light having an emitted light waveform; receiving and acquiring an individual complete trace of a reflection/backscatter of the emitted light on the object in the environment at each sub-detector of the plurality, thereby combining the individual narrow field-of-view to create the wide field-of-view encompassing the width of the environment and thereby receiving and acquiring an individual complete trace for each channel; converting the acquired individual complete trace of the reflection/backscatter into an individual digital signal; and detecting and identifying at least one of a presence of an object in the environment, a position of the object in the environment, a distance between the object and the LED light source and a visibility in the environment, using the emitted light waveform and at least one of the individual digital signal.

According to one embodiment, a multi-channel LED object detection system for detecting an object located in an environment is provided. It includes a Light-Emitting-Diode (LED) light source having a wide field-of-illumination oriented for the wide field-of-illumination to encompass the width of the environment; a source controller for the LED light source for driving the LED light source into emitting light toward the environment, the width of the environment being illuminated by the light, the light having an emitted light waveform; an optical detector having a wide field-of-view oriented for the wide field-of-view to encompass the width of the environment, the optical detector having a plurality of sub-detectors, each having an individual narrow field-of-view, each individual narrow field-of-view creating a channel in the wide field-of-view, the optical detector receiving an individual complete trace of a reflection/backscatter of the emitted light on the object in the environment at each sub-detector of the plurality, thereby combining the individual narrow field-of-view to create the wide field-of-view encompassing the width of the environment and thereby receiving and acquiring an individual complete trace for each channel; an analog-to-digital converter for converting each the individual complete trace of the reflection/backscatter into an individual digital signal; a memory for acquiring and storing each the individual complete trace; and a signal processor for detecting and identifying at least one of a presence of an object in the environment, a position of the object in the environment, a distance between the object and the LED light source and a visibility in the environment, using the emitted light waveform and at least one of the individual digital signal and outputting a data output associated to the object.

Throughout this specification, the term "non-visible" is intended to be a synonym of the terms "invisible" and "nonvisible" and to be an antonym to the word "visible". It should be understood that "visible light" refers to light emitted at wavelengths which are visible to the human eye. Similarly, "invisible light" refers to light emitted at wavelengths which are not visible to the human eye.

Throughout this specification, the term "vehicle" is intended to include any movable means of transportation for cargo, humans and animals, not necessarily restricted to ground transportation, including wheeled and unwheeled vehicles, such as, for example, a truck, a bus, a boat, a subway car, a train wagon, an aerial tramway car, a ski lift, a plane, a car, a motorcycle, a tricycle, a bicycle, a Segway™, a carriage, a wheelbarrow, a stroller, etc.

Throughout this specification, the term "environmental particle" is intended to include any particle detectable in the air or on the ground and which is typically caused by an environmental, chemical or natural phenomenon. It includes fog, rain, snow, smoke, gas, smog, black ice, hail, etc.

Throughout this specification, the term "object" is intended to include a moving object and a stationary object. For example, it can be a vehicle, an environmental particle, a person, a passenger, an animal, a gas, a liquid, a particle such as dust, a pavement, a wall, a post, a sidewalk, a ground surface, a tree, etc.

Throughout this specification, the term "wide" is intended to be the opposite of "narrow". The terms "narrow" and "wide" refer to sizes of the field-of-illumination, field-of-view, channel and environment. They are intended to describe a measurement in any 3D direction, namely in width, height or length, depending on the orientation of the LED light source and of the optical detector.

BRIEF DESCRIPTION OF THE DRAWINGS

Having thus generally described the nature of the invention, reference will now be made to the accompanying drawings, showing by way of illustration a preferred embodiment thereof and in which.

It will be noted that throughout the appended drawings, like features are identified by like reference numerals.

DETAILED DESCRIPTION

Figure 1:
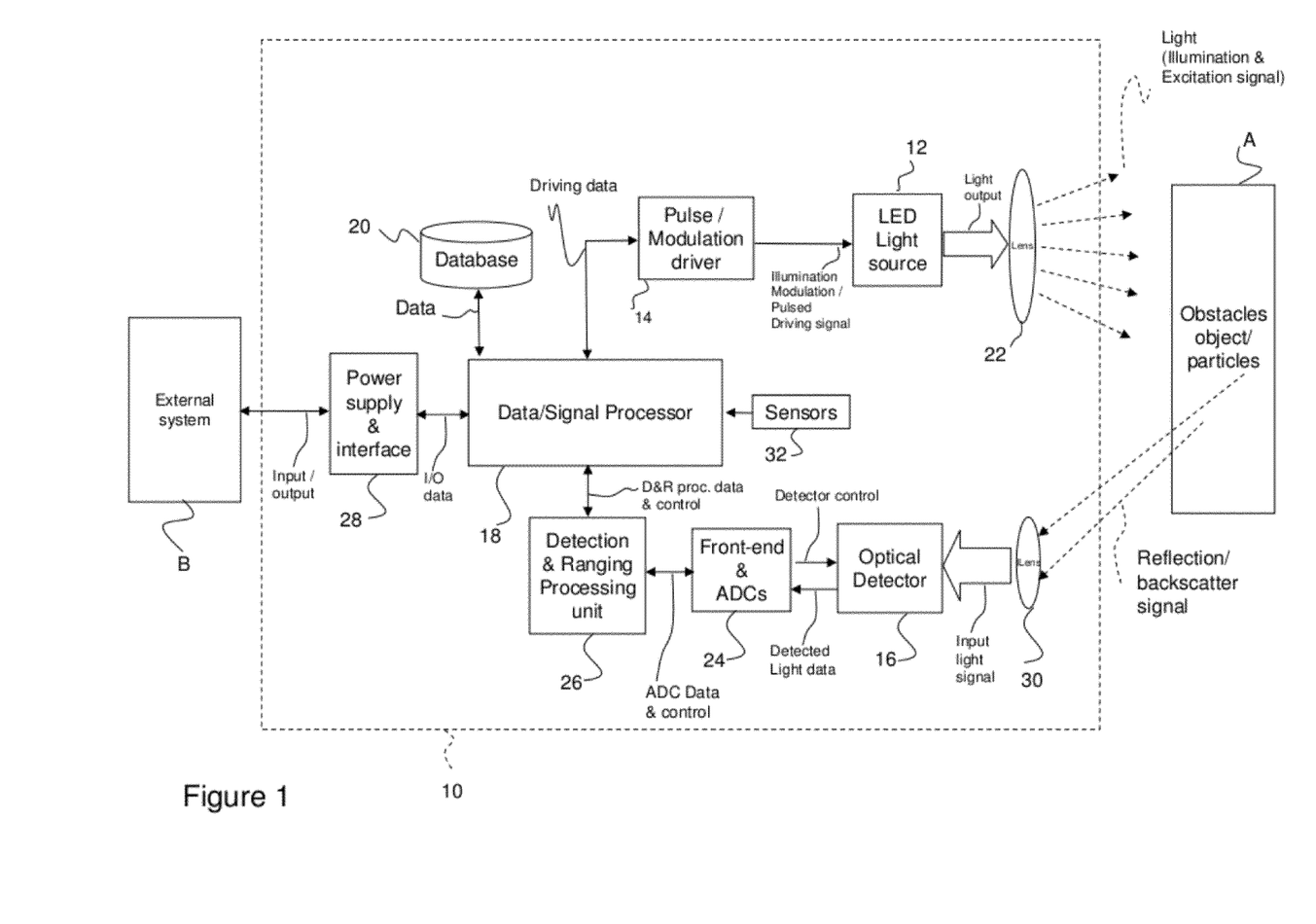
FIG. 1 is a block diagram illustrating an example multi-channel LED object detection system.

Referring to FIG. 1, a multichannel LED objet detecting system in accordance with one example embodiment is generally shown at 10.

The system 10 has at least one LED as a LED light source 12. The LED light source 12 can be invisible, visible or can include LEDs of both types.

The LED light source 12 is connected to a source controller 14 which is also referred to as the Pulse/Modulation driver 14, so as to be driven into producing illumination. In addition to emitting light, the system 10 performs the detection of objects when these objects are part of the environment/scene illuminated by the LED light source 12. The source controller 14 drives the LED light source 12 such that the emitted light can take the form of a light signal, for instance by way of amplitude-modulated or pulsed light emission, either in the visible or non-visible range of wavelengths.

All LEDs in a single module can be controlled by the same control signal or each one or a cluster of LEDs can be controlled by several independent control signals from the source controller 14. Each LED, or cluster of LEDs, can be controlled to create a beam pattern to meet the needs in terms of detection in the scene. Several beams can be used individually to illuminate the scene.

A modulated/pulsed driving signal supplies the fast modulation/pulse sequence required for remote object detection. Using LEDs, the amplitude of short-pulse (typ. <50 ns) can be several times the nominal value (typ. 10 to 100) while the duty cycle is low (typ. <0.1%)

In one embodiment, the system 10 can have at least one optical component 22, typically lenses and/or diffusers, which is used for the collimation and the distribution of the optical output of LED(s) and make the illumination for the scene in concordance with FOV of the detection zone. Reflectors can also be used to redirect the light. Optical component 22 can be integrated in a window that also includes a lens for the optical detector.

An optical detector array 16 (or a plurality of optical detectors) associated with the LED light source 12 and an optical lens 30 collects the light emitted by the LED light source 12 and back-scattered by the objects A. The optical detector array 16 receives an echo back signal from an object in the FOV. Each pixel of the detector array 16 acts as a discrete detector with a specific field of view (FOV) and probes a specific portion of the illuminated scene.

The light signal can also come from an object A being the direct source of this light (such as a remote control) in order to send information to the data/signal processor 18 through the optical detector 16. The optical detector 16 is as an example any of photodiodes, avalanche photodiodes (APD), photomultipliers (PMT), CCD or CMOS array sensors, amongst others. Other array sensors can be integrated, thermal sensor for instance. In the case of a LED light source 12, a wavelength measurement sensor can be integrated to measure the drift of the light source and estimate the temperature of the LEDs for lifetime assessment, temperature control and maintenance purposes.

Information can be provided in the form of distance measurement and other visual information to the External system B. The optical detector 16, whether located in the external or internal module, may be separate from the LED light source 12 and integrated with other electronics parts elsewhere.

Filters are typically provided with the detector 16 to attenuate ambient light background emitted from sources other than the system 10. Filters can also be used for spectroscopic measurements and to enhance performance of the LED light source 12.

A database 20 may be provided in association with the data/signal processor 18 so as to provide historical data, or tabulated data to accelerate the calculation of the object parameters.

When a plurality of a multichannel LED objet detecting system 10 is used, a signature modulation is considered so as to avoid interference between signals of the different multichannel LED objet detecting system 10.

A front-end and analog-to-digital converter (ADC) 24 is connected to detector 16 and receives detected light data therefrom and controls the detector. Gain of amplifier and other adjustment can be controlled. The front-end and ADC 24 can have several parallel channels to digitalize the information or a multiplexer for acquiring at least two optical sensing elements.

A detection and ranging processing unit 26 is connected to the front-end 24, controls parameters such as gain of amplifier, synchronization and sample rate of the ADC, receives data from ADC and processes the data. Shift control for acquisition can improve accuracy with the same ADC sampling rate. For instance, a 20MSPS ADC can have an improved resolution if successive acquisitions are delayed y an equivalent fraction of the acquisition time period. A better resolution increases the precision when measuring the rise time or the peak position of the signal.

Interpolation and differential calculus can be processed by the detection and ranging processing unit 26 to increase the precision. Averaging is another pre-process treatment to improve signal/noise ratio. Other techniques like a moving-average filter improve the performance. Match filter (input/output signals) improve the resolution. An object can also be locked and followed with FFT processing. A specific processing function can be used for each point of the LIDAR trace.

For instance, more samples can be averaged for a point which represents farther distance (trade-off between signal-to-noise ratio and number of results per second). More shift control (delay) can be used for acquisition in the short range (more resolution to measure the distance) and more samples typically result in a better signal-to-noise ratio for acquisition in the long range. Specific processing can be used for overlapping regions at a certain distance covered by more than one detector. The detection and ranging processing unit 26 can also be used for pre-process speed computation. Some environmental/weather conditions like fog, snow, rain, or dust, to name a few, can be estimated, whereby slid objects and slippery surfaces can be detected. The cleanliness of the optical components and the required maintenance can also be detected.

The data/signal processor 18 is connected to the detection and ranging processing unit 26, and receives pre-processed data. The source controller 14 receives its driving data from the data/signal processor and/or from the detection & ranging processing unit 26. As will be readily understood, the data/signal processor 18 and the detection and ranging processing unit 26 could be combined into a single unit. The data/signal processor 18 has a processing unit (e.g., CPU) so as to interpret the pre-processed data from the detection and ranging processing unit 26, in comparison with the driving data of the source controller 14, which provides information about the emission of the light signals emitted by the LED light source 12.

Accordingly, information about the object (e.g., presence, distance, speed of displacement, dimension, visibility) is calculated by the data/signal processor 18 as a function of the relation (e.g., phase difference, relative intensity, spectral content, time of flight, etc.) between the driving data and the detected light data, as optionally pre-processed by the front-end and ADC 24 and the detection and ranging processing unit 26. The speed of the object can also be measured with the modulation phase shift measurement (or time of flight of pulsed light) technique described previously. The measurement of vehicle speed is also possible either by distance measurement.

The system 10 has a power supply and interface 28. The interface 28 is connected to the data/signal processor 18 and is in communication with External system B. The interface 28 could be Ethernet, PoE, CANbus, USB or any other interface type.

The system 10 has sensors 32 connected to data/signal processor 18. Sensors 32 are composed with an inclinometer, accelerometer, speedometer, temperature sensor, day/night sensor to name a few type of sensors. Those sensors 32 are useful during the installation and during operation. For instance, data from inclinometer, speedometer, and accelerometer are useful to compensate for the impact on the field of view by the effect of vibration and speed. Temperature sensors are useful to provide information about weather (internal, external or remote temperature with FIR lens). Thermal sensor can be useful to determine the temperature of objects and classify these objects (human, animals, vehicles, trees, etc.).

In view of the calculation it performs, the data/signal processor 18 controls the source controller 14 and thus the light output of the LED light source 12. For instance, the LED light source 12 may be required to increase or reduce its intensity, or change the parameters of its output.

In an embodiment, the data/signal processor 18 may send the calculation output to External system B in such a way that the External system B acts upon the information provided by the data/signal processor 18. The External system B can also give input parameters/commands to be used to the data/signal processor 18. These parameters can be adjustments to be performed to current calibration, new programs to be implemented for the current application, or data to be added to the database 20. This information can be used by the data/signal processor 18 to complete its operation.

Figure 2:
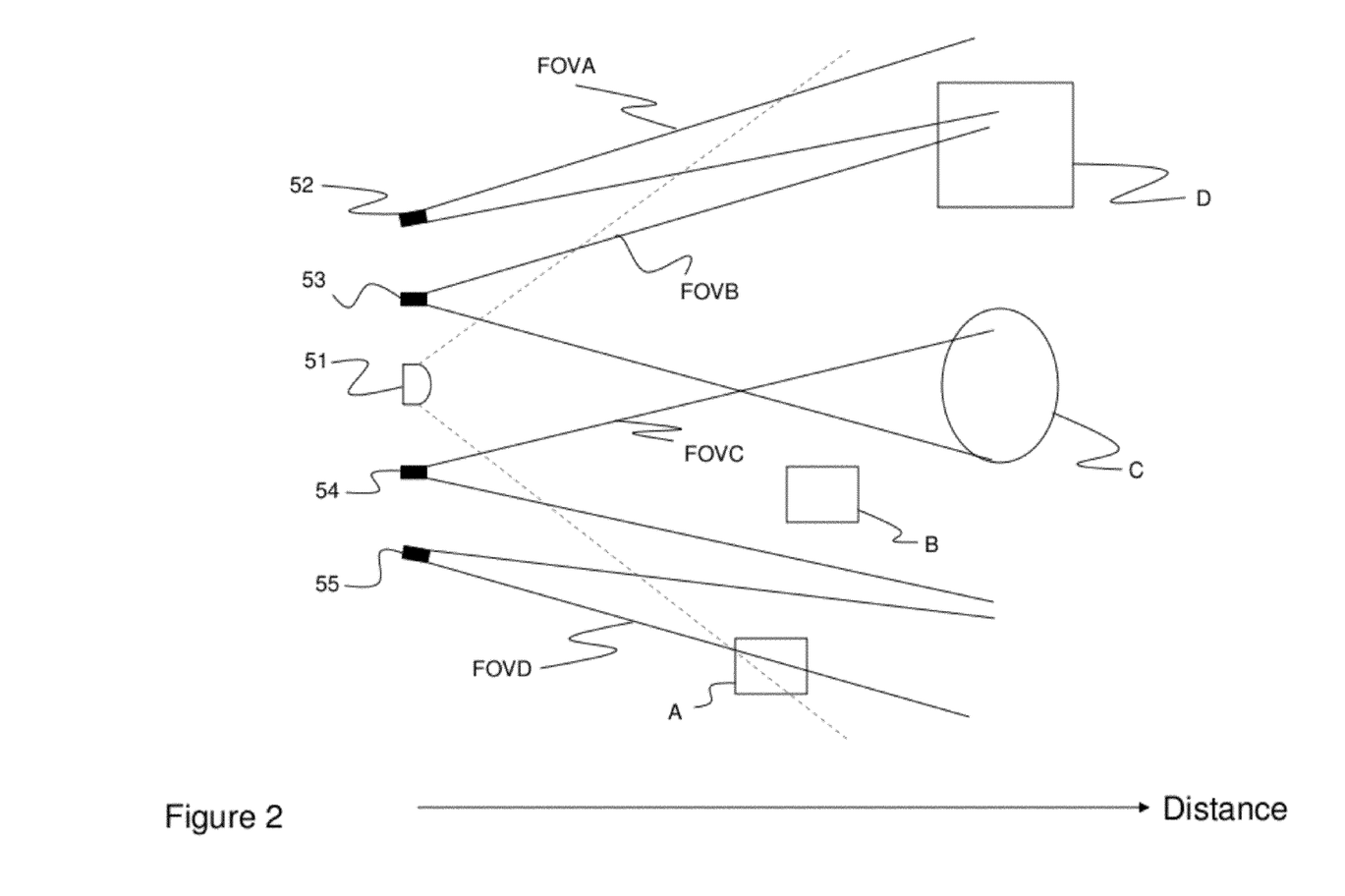
FIG. 2 is a schematic view of an example multi-channel LED object detection system, with multiple detectors.

Referring to FIG. 2, an alternative embodiment of the sensor configuration involves a plurality of discrete detectors 52, 53, 54, 55, each observing a respective fixed field of view FOVA through FOVD within a volume of space illuminated by the light source 51 and comprising objects A through D. Fields of view of the detectors are narrow or might be a combination of narrow and wide field of views as a trade-off between distance accuracy and number of detectors necessary. The optical detector is as an example any of photodiodes, APD or PMT. Such a configuration provides simplicity of design at the price of increased number of components and less intuitive integration.

Figure 3:
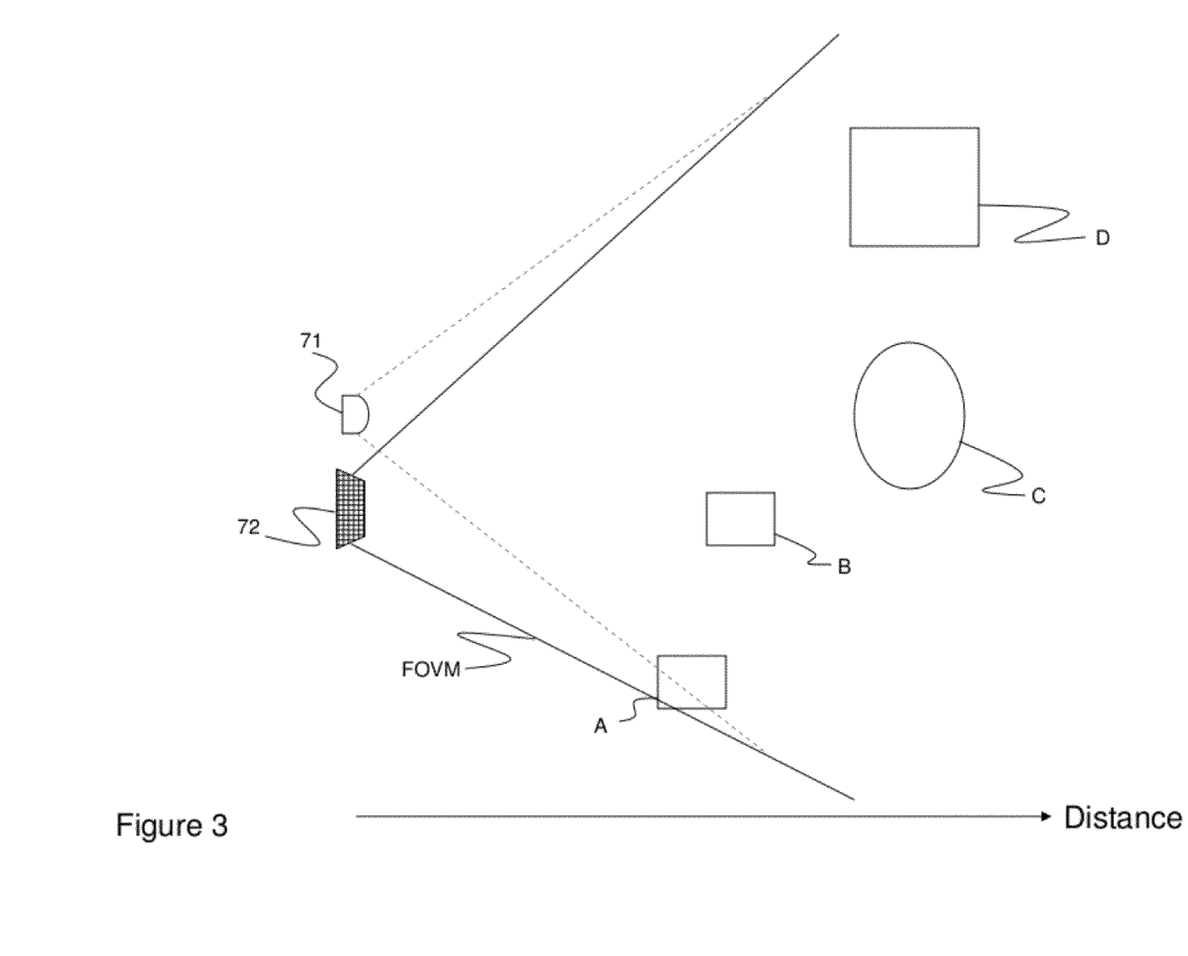
FIG. 3 is a schematic view of an example multi-channel LED object detection system, using a detector array.

In another alternative embodiment of the sensor configuration illustrated by FIG. 3, a detection array 72 is used with a large field of view FOVM encompassing the whole illuminated scene. Each pixel of the array 72 acts as a discrete detector with a very narrow field of view and probes a specific portion of the illuminated scene, as determined by any secondary optics in front of the array. The array 72 is any linear or 2D type array, such as APD or photodiode arrays, CCD and CMOS sensors.

Figure 4:
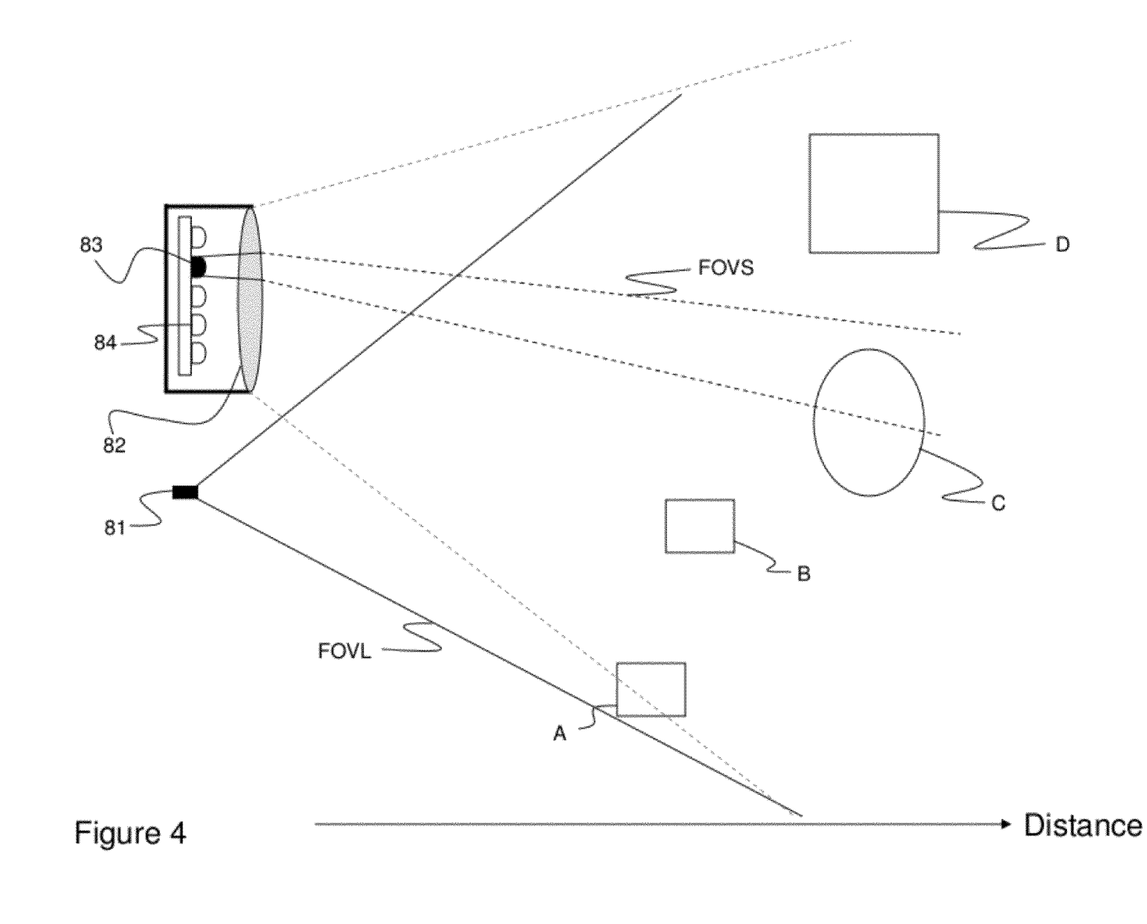
FIG. 4 is a schematic view of example multi-channel LED object detection system, using a light source array.

Another alternative embodiment presented in FIG. 4 transfers to the source side the need to select a field of view of detection from within the field of view of illumination. In this embodiment, the light source 82 is composed of multiple individual lighting elements 83, 84 (e.g. LEDs or small clusters of LEDs) that are driven by the source controller 14 to be turned on simultaneously or in sequence. The driven light element, illustrated by 83, illuminates only a portion of the scene with a small or narrow field of view FOVS, as determined by the appropriately designed secondary optics, while the other elements 84 are turned off. The secondary optics may take various forms (e.g., bulk, fiber) in accordance with the application.

In such a configuration, a detector 81, including multiple sub-detectors (not shown), with a large or wide field of view FOVL encompassing the entire illuminated scene will be sensitive only to objects within FOVS (for example, Object C in FIG. 4). Again, the detector 81 may be any of a photodiode, an APD, a PMT or equivalent thereof.

Figure 5:
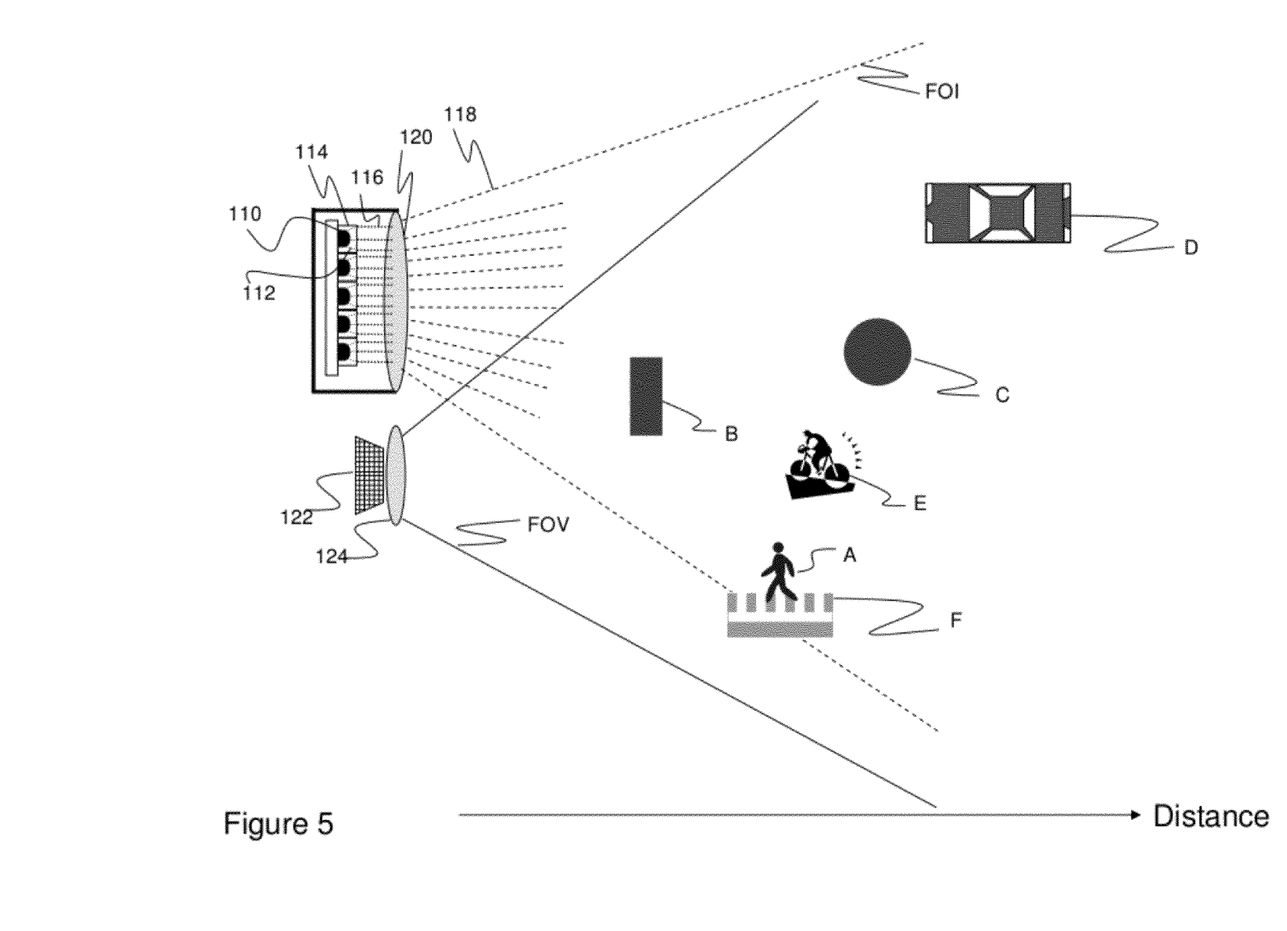
FIG. 5 is a schematic view of an example multi-channel LED object detection system, with a lens and a diffuser.

In one embodiment of the sensor configuration illustrated in FIG. 5, at least one LED light source 110 emits photons 112 (visible or invisible) with a very wide angle (120° for instance). A primary optic 114, typically a nonimaging optical lens or concentrator, is used for the collimation of the optical output of LED(s) and make a LED beam 116. A secondary optic 118, typically a diffuser, is used to produce the required irradiance distribution 120 with homogeneous illumination all over the FOI and in concordance with FOV of the detection zone. An optical detector array 122 and an optical lens 124 received echo back signal from object in the FOV (pedestrian A, object B and C, car D, Cyclist and/or its bicycle E, Pavement F). Each pixel of the detector array 122 acts as a discrete detector with a narrow field of view and probe a specific portion of the illuminated scene.

Figure 6:
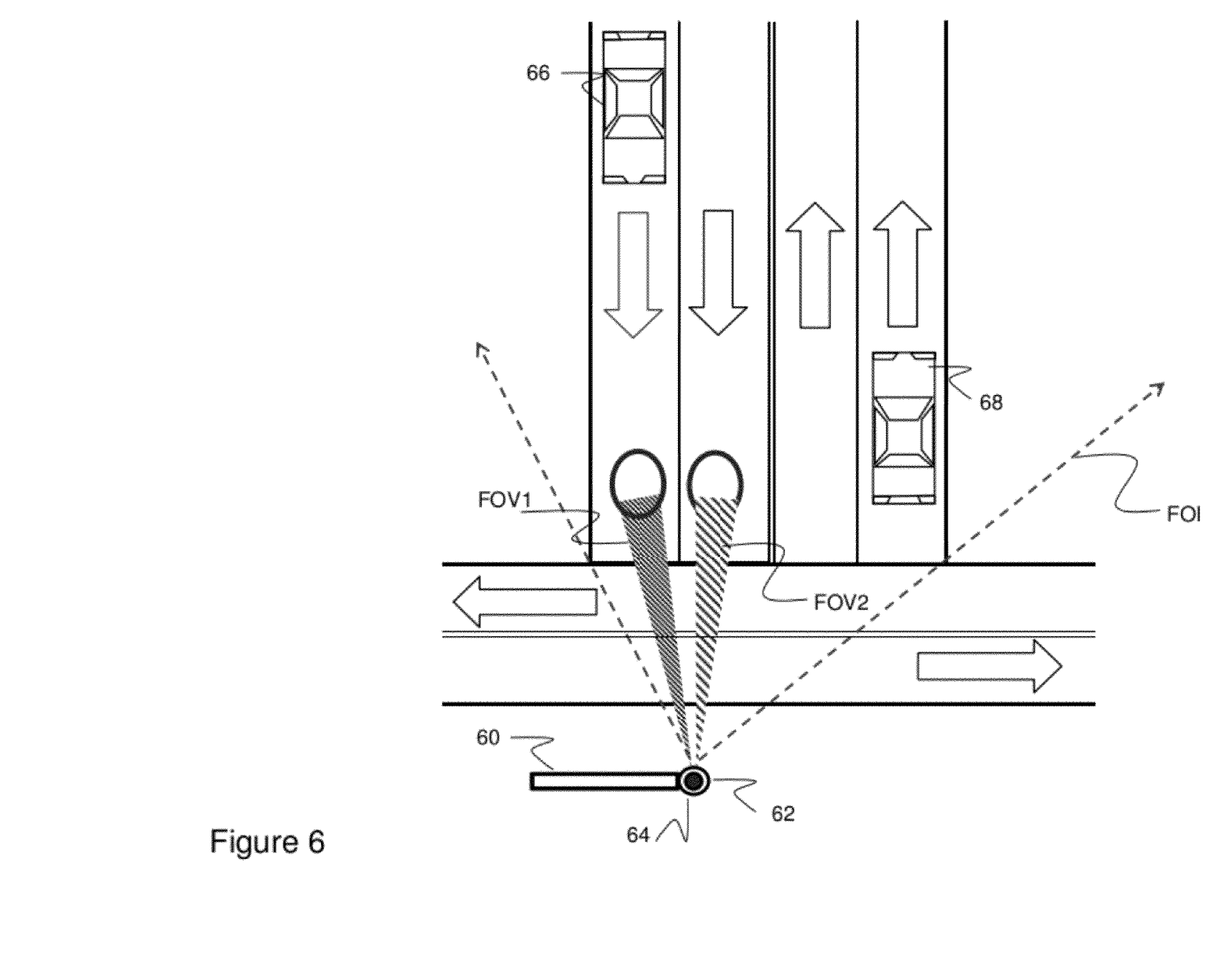
FIG. 6 is a schematic view of an example multi-channel LED object detection system, in a traffic application.

FIG. 6 shows an application of an example multichannel LED object detection system. In this application, the system is installed in a traffic application. The traffic light unit 60 is fitted with a light source 62 and an optical detector 64. The optical detector 64 comprises a plurality of sub-detectors. The field-of-view of two of the sub-detectors are shown as FOV1 and FOV2. The field of illumination of the LED light source is shown as FOI and encompasses the whole width of the environment in which objects are to be detected. Car 66 is approaching the area where it will be located in the FOV1 of a sub-detector of optical detector 64. The multichannel LED object detection system will be able to detect its presence in FOV1 when it reaches the area of detection.

As will be readily understood, a maximal detection zone is chosen at the time of installation of the system. This environment, scene or detection zone is a volume within which objects are to be detected. This detection zone has a width, a height and a depth. In most traffic applications the detection zone will be somewhat rectangular in shape, covering a region of interest in side-by-side traffic lanes. For example, the region could be located about 15 m from the LED light source for a depth of 10 m, for a height of a 10 m and for a width equal to the width of the traffic lanes to monitor with the detection system. Each channel of the multichannel LED object detection system will be installed and calibrated so that it monitors a region of interest in the traffic circulation, for example, two traffic lanes for circulation in one direction, one bi-directional cycle lane (not shown) and one pedestrian crossing waiting zone (not shown). The width of the overall detection zone is likely to be greater than the depth and height of the detection zone thereby creating a horizontal rectangular zone. The wide field of illumination of the LED light source is then the width of the detection zone.

In another application, the multichannel LED object detection system is also rectangular but in a vertical orientation. The detection system can be used for parking assistance to detect the presence of a sidewalk, curb, mailbox, parking meter, street lamp post, vehicle, bicycle, etc. The detection zone is then defined to be a vertically elongated region in front of the front or the back of the vehicle. The height of the region is greater than the width and the length of the region. The wide field of illumination of the LED light source is then the height of the detection zone.

Figure 7:
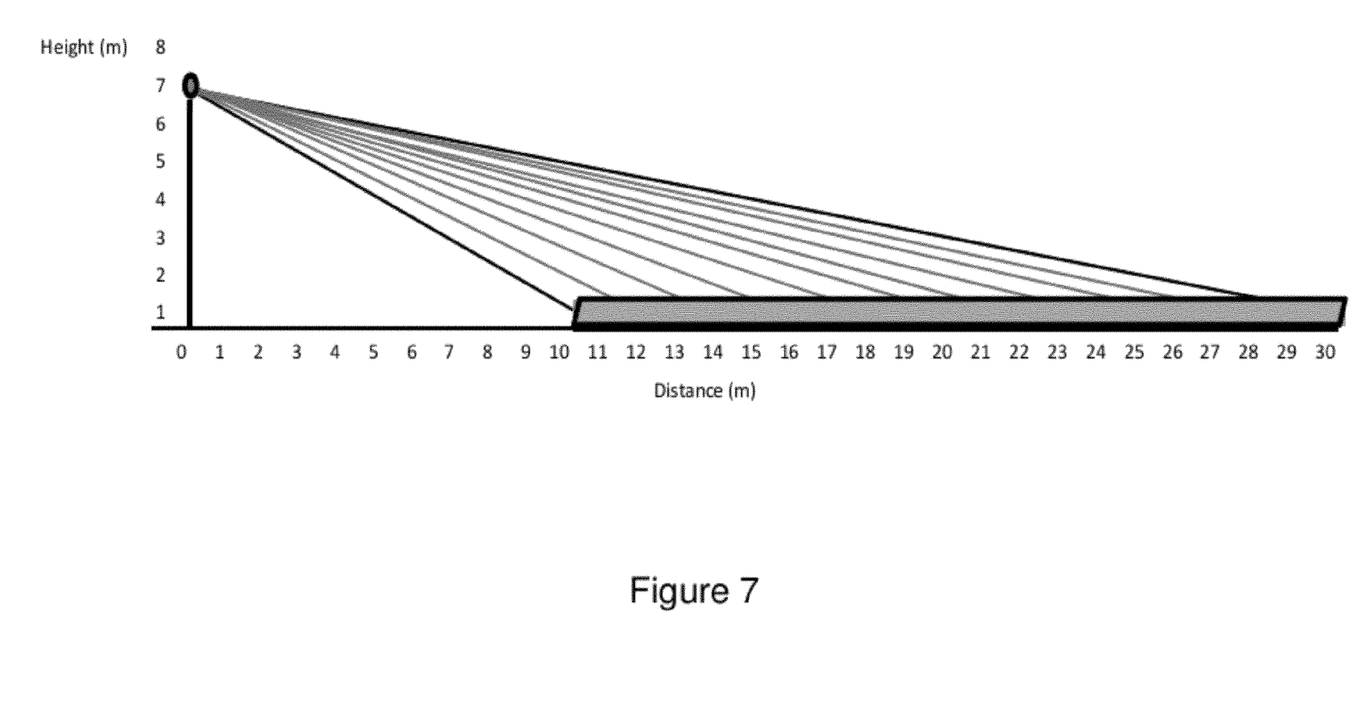
FIG. 7 is a schematic view a calibration of an example multi-channel LED object detection system.

In FIG. 7, the calibration process is schematized. During calibration, the limits of the field of view of the detector are associated with a distance from the traffic light unit, so as to calibrate the detector. As an example, information may be entered using a user interface of the data/signal processor 18.

Figure 8:
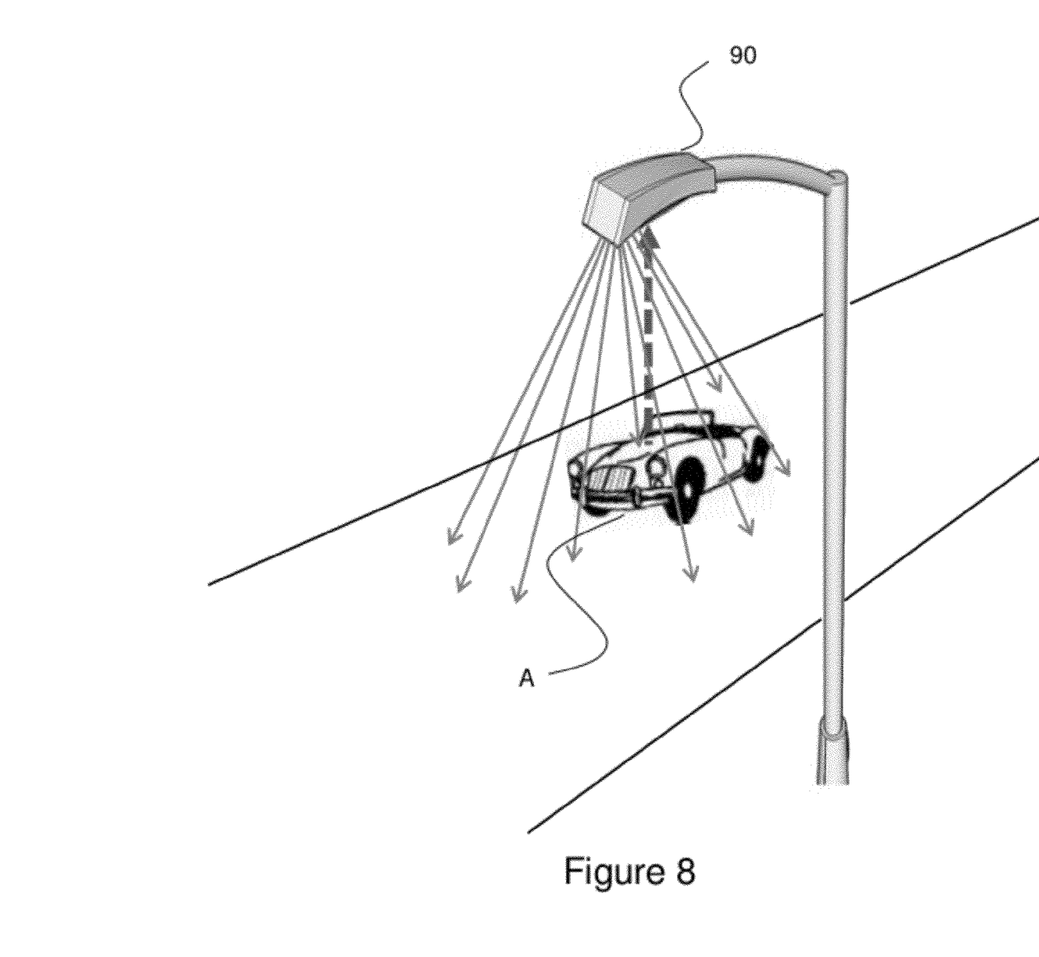
FIG. 8 is a schematic view of a street light equipped with an example multi-channel LED object detection system and detecting a vehicle.

In FIG. 8, the multichannel LED object detection system is shown in a street lamp application. The detection zone is conic in shape, the base of the prism being somewhat square. The width and length of the region will be of similar dimension and the height will be small. The wide field of illumination of the LED light source can then be either the width or the length of the detection zone. Therefore, upon detecting a vehicle, the street light 90 signals the detection to the external system B (FIG. 1). The external system B forwards the information or commands to an appropriate traffic light, for example to control the emission of signals.

The measurement of vehicle speed is also possible either by distance measurement or by measurement of their time of passage at different points along the street lane beneath the LED street-lighting devices.

In summary, a method for detecting an object located in an environment can include a few steps. A Light-Emitting-Diode (LED) light source having a wide field-of-illumination is provided and oriented such that the wide field-of-illumination encompasses a width of the environment. An optical detector having a wide field-of-view is provided and oriented such that the wide field-of-view encompasses the width of the environment. The LED light source is driven into emitting light toward the environment, the width of the environment being illuminated by the light. A complete trace of a reflection/backscatter of the emitted light on the object in the environment is received and acquired a using the optical detector. The acquired complete trace of the reflection/backscatter is then converted into a digital signal. Finally, a step of detecting and identifying is carried out to detect and identify at least one of a presence of an object in the environment, a position of the object in the environment, a distance between the object and the LED light source and a visibility in the environment, using the digital signal.

The LED light source can be a visible or invisible LED light source. The LED light source can also include a plurality of LEDs. If the LED light source includes a plurality of LEDs, none, some or all of the LEDs can be invisible LEDs. If a plurality of LEDs is used, they can be driven to illuminate simultaneously, in sequence or in combination. Their fields-of-illumination can overlap partly or completely or they can be adjacent to one another.

The optical detector can include a plurality of optical sub-detectors, each having an individual narrow field-of-view. The optical sub-detectors can detect simultaneously, in sequence or in combination. Their fields-of-view can overlap partly or completely or they can be adjacent to one another. Each optical sub-detector is able to receive and acquire a complete trace of the reflection for its own field-of-view, thereby creating a channel in the environment in which it is acquiring. The use of a plurality of sub-detectors allows a multichannel object detection. The detection can be performed in one, multiple or all channels. Regardless of whether a single or a plurality of optical detectors is used, the steps of the method can be repeated to receive and acquire additional time-spaced complete traces for each channel. The individual traces from different channels or the time-spaced traces for a single channel can be analyzed in combination to further detect and identify objects and properties of these objects, such as a displacement speed of the object, a shape of the object and a dimension of the object.

In summary, a multi-channel LED object detection system for detecting an object located in an environment can include the following components: a Light-Emitting-Diode (LED) light source having a wide field-of-illumination oriented for the wide field-of-illumination to encompass the width of the environment; a source controller for the LED light source for driving the LED light source into emitting light toward the environment, the width of the environment being illuminated by the light; an optical detector having a wide field-of-view oriented for the wide field-of-view to encompass the width of the environment, the optical detector receiving a complete trace of a reflection/backscatter of the emitted light on the object in the environment; an analog-to-digital converter for converting the complete trace of the reflection/backscatter into a digital signal; a memory for acquiring and storing the complete trace; and a signal processor for detecting and identifying at least one of a presence of an object in the environment, a position of the object in the environment and a distance between the object and the LED light source, using the digital signal and outputting a data output associated to the object.

An infrared LED light source can be used.

The multi-channel LED object detection system can further include a lens and a diffuser, the lens for collimating the power of the light source, the diffuser for diffusing the collimated power to illuminate the environment.

The wide field-of-illumination can have an angular range of more than 10 degrees in one embodiment. In one embodiment, the angular range is between 15 and 180 degrees. In one embodiment, the angular range is between 15 and 90 degrees.

While illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the described embodiment.

The embodiments described above are intended to be exemplary only. The scope of the invention is therefore intended to be limited solely by the appended claims.

We claim:

1. A method for detecting an object located in an environment, said environment having a width, comprising:

providing a Light-Emitting-Diode (LED) light source having a wide field-of-illumination and orienting said LED light source for said wide field-of-illumination to encompass said width of said environment;

providing an optical detector having a wide field-of-view and orienting said optical detector for said wide field-of-view to encompass said width of said environment, said optical detector having a plurality of sub-detectors, each having an individual narrow field-of-view, each individual narrow field-of-view creating a channel in said wide field-of-view;

driving the LED light source into emitting light toward the environment, said width of said environment being illuminated by said light, said light having an emitted light waveform, said emitted light waveform having short light pulses, each light pulse having a width of less than 50 ns and an amplitude greater than a nominal value of said LED light source and said waveform having a low duty cycle;

receiving and acquiring an individual complete temporal waveform trace of a reflection/backscatter of the emitted light on the object in the environment at each sub-detector of said plurality, thereby combining said individual narrow field-of-view to create said wide field-of-view encompassing said width of said environment and thereby receiving and acquiring an individual complete trace for each channel, said individual complete temporal waveform trace being acquired from a moment when said emitting begins over a length of time continuing after said emitting has ended and ending before emission of a next one of said short light pulses, said acquiring including acquiring and storing multiple time-spaced sampling points at each sub-detector to acquire and store said individual complete temporal waveform trace;

converting said acquired individual complete trace of said reflection/backscatter into an individual digital signal; and detecting and identifying at least one of a presence of an object in the environment, a position of the object in the environment, a distance between the object and the LED light source and a visibility in said environment, using said emitted light waveform and at least one of said individual digital signal.

2. The method as claimed in claim 1, wherein said providing a LED light source comprises providing an invisible LED light source and said driving said invisible LED light source comprises illuminating said environment using non-visible light for said detection.

3. The method as claimed in claim 1, wherein said providing a LED light source comprises providing a visible LED light source and said driving said visible LED light source comprises at least one of illuminating said environment using visible light for said detection and emitting a signal to a person in the environment.

4. The method as claimed in claim 1, wherein the step of driving the LED light source comprises at least one of pulsating and modulating the light.

5. The method as claimed in claim 1, wherein said providing a LED light source comprises providing at least one visible LED light source and at least one invisible LED light source and wherein said driving said LED light source comprises driving said invisible LED light source for illuminating said environment using non-visible light for said detection and driving said visible LED light source for at least one of illuminating said environment using visible light for said detection and emitting a signal to a person in the environment.

6. The method as claimed in claim 1, wherein said step of providing a LED light source comprises providing a plurality of LED light sources, each having an individual narrow field-of-illumination, wherein said step of driving the LED light source comprises driving said plurality of LED light sources to emit light in combination, thereby combining said individual narrow field-of-illumination to create said wide field-of-illumination encompassing said width of said environment.

7. The method as claimed in claim 6, wherein said driving said plurality of LED light sources includes driving said LED light sources to emit light one of in sequence and simultaneously.

8. The method as claimed in claim 1, wherein said step of detecting and identifying further comprises combining information obtained from at least two individual digital signals to detect and identify.

9. The method as claimed in claim 1, wherein said detecting and identifying said distance comprises measuring a time delay between said driving the LED light source to emit the light and said receiving said complete trace.

10. The method as claimed in claim 1, further comprising repeating said steps of driving, receiving and acquiring, converting and detecting and identifying to cumulate a plurality of time-spaced digital signals for said detector.

11. The method as claimed in claim 10, further comprising analyzing said plurality of time-spaced digital signals to determine at least one of a displacement speed of said object, a shape of said object and a dimension of said object.

12. The method as claimed in claim 1, wherein said visibility is an environmental condition, said environmental condition being a presence of one of fog, rain, snow, dust, smoke, gas, smog.

13. A multi-channel LED object detection system for detecting an object located in an environment, said environment having a width, comprising:

a Light-Emitting-Diode (LED) light source having a wide field-of-illumination oriented for said wide field-of-illumination to encompass said width of said environment;

a source controller for said LED light source for driving said LED light source into emitting light toward the environment, said width of said environment being illuminated by said light, said light having an emitted light waveform, said emitted light waveform having short light pulses, each light pulse having a width of less than 50 ns and an amplitude greater than a nominal value of said LED light source and said waveform having a low duty cycle;

an optical detector having a wide field-of-view oriented for said wide field-of-view to encompass said width of said environment, said optical detector having a plurality of sub-detectors, each having an individual narrow field-of-view, each individual narrow field-of-view creating a channel in said wide field-of-view, said optical detector receiving an individual complete temporal waveform trace of a reflection/backscatter of the emitted light on the object in the environment at each sub-detector of said plurality, thereby combining said individual narrow field-of-view to create said wide field-of-view encompassing said width of said environment and thereby receiving and acquiring an individual complete trace for each channel, said individual complete temporal waveform trace being acquired from a moment when said source controller drives said LED light source to emit and over a length of time continuing after said source controller has stopped driving said LED light source to emit and ending before said source controller drives said LED light source to emit a next one of said short light pulses, said optical detector acquiring and storing multiple time-spaced sampling points at each sub-detector to acquire and store said individual complete temporal waveform trace;

an analog-to-digital converter for converting each said individual complete trace of said reflection/backscatter into an individual digital signal;

a memory for acquiring and storing each said individual complete trace; and a signal processor for detecting and identifying at least one of a presence of an object in the environment, a position of the object in the environment, a distance between the object and the LED light source and a visibility in said environment, using said emitted light waveform and at least one of said individual digital signal and outputting a data output associated to the object.

14. The multi-channel LED object detection system as claimed in claim 13, wherein said LED light source is an invisible LED light source and said width of said environment is illuminated by non-visible light for said detection.

15. The multi-channel LED object detection system as claimed in claim 14, wherein said invisible LED light source is an infrared LED light source.

16. The multi-channel LED object detection system as claimed in claim 13, wherein said LED light source comprises a plurality of LED light sources, each having an individual narrow field-of-illumination, and wherein said source controller drives said plurality of LED light sources to emit light in combination, thereby combining said individual narrow field-of-illumination to create said wide field-of-illumination encompassing said width of said environment.

17. The multi-channel LED object detection system as claimed in claim 16, wherein said plurality of LED light sources is multiple small clusters of LEDs.

18. The multi-channel LED object detection system as claimed in claim 13, further comprising a lens and a diffuser, said lens for collimating the power of said light source, said diffuser for diffusing said collimated power to illuminate said environment.

19. The multi-channel LED object detection system as claimed in claim 13, wherein said plurality of optical sub-detectors is arranged in a detector array, said detector array is one of a linear array, a 2D type array, an APD array, a photo-diode array, a CCD sensor and a CMOS sensor.

20. The multi-channel LED object detection system as claimed in claim 13, wherein said object is at least one of a vehicle, a truck, a boat, a car, a motorcycle, a tricycle, a bicycle, a person, a pavement, a sidewalk, a ground surface, a particle, an environmental particle, a wall, a post, a stationary object and a moving object.

21. The multi-channel LED object detection system as claimed in claim 13, wherein said wide field-of-illumination has an angular range of more than 10 degrees.

22. The multi-channel LED object detection system as claimed in claim 21, wherein said angular range of said field-of-illumination is between 15 and 180 degrees.

* * * * *

UNITED STATES PATENT AND TRADEMARK OFFICE
CERTIFICATE OF CORRECTION

PATENT NO. : 8,242,476 B2  Page 1 of 1
APPLICATION NO. : 12/949212
DATED : August 14, 2012
INVENTOR(S) : Yvan Mimeault et al.

It is certified that error appears in the above-identified patent and that said Letters Patent is hereby corrected as shown below:

Title Page, Item (63) Rel. U.S. Appl. Data: should read,

-- Continuation-in-part of application No. 11/612,678, filed on Dec. 19, 2006, now Pat. No. 7,855,376, and a continuation of application No. 12/664,744, filed as application No. PCT/CA2008/001161 on Jun. 18, 2008 and a continuation of application No. 12/664,753, filed as application No. PCT/CA2008/001160 on Jun. 18, 2008. --.

Signed and Sealed this
Sixteenth Day of October, 2012

David J. Kappos
*Director of the United States Patent and Trademark Office*